United States Patent
Wang et al.

(10) Patent No.: US 12,216,928 B2
(45) Date of Patent: **\*Feb. 4, 2025**

(54) FRAGMENT MANAGEMENT METHOD AND FRAGMENT MANAGEMENT APPARATUS

(71) Applicant: Huawei Technologies Co., Ltd., Shenzhen (CN)

(72) Inventors: Chen Wang, Shenzhen (CN); Tangren Yao, Shenzhen (CN); Feng Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,262

(22) Filed: Jan. 12, 2022

(65) Prior Publication Data
US 2022/0137849 A1 May 5, 2022

Related U.S. Application Data

(63) Continuation of application No. 16/718,976, filed on Dec. 18, 2019, now Pat. No. 11,243,706, which is a continuation of application No. PCT/CN2018/075188, filed on Feb. 3, 2018.

(30) Foreign Application Priority Data

Jun. 29, 2017 (CN) .......................... 201710515966.2

(51) Int. Cl.
*G06F 3/06* (2006.01)
(52) U.S. Cl.
CPC .......... *G06F 3/0647* (2013.01); *G06F 3/0604* (2013.01); *G06F 3/0619* (2013.01); *G06F 3/067* (2013.01)
(58) Field of Classification Search
CPC .................................... G06F 3/0647

USPC ......................... 711/114, 154; 714/766, 6.12
See application file for complete search history.

(56) References Cited

U.S. PATENT DOCUMENTS

| | | | |
|---|---|---|---|
| 9,378,088 B1 | 6/2016 | Piszczek et al. | |
| 9,672,905 B1 | 6/2017 | Gold et al. | |
| 10,635,340 B2 | 4/2020 | Danilov et al. | |
| 11,630,729 B2 * | 4/2023 | Menon ............. | H03M 13/1515 714/6.12 |
| 2003/0165150 A1 | 9/2003 | Zimmermann et al. | |
| 2006/0242091 A1 | 10/2006 | Jansky | |

(Continued)

FOREIGN PATENT DOCUMENTS

| CN | 103095805 A | 5/2013 |
|---|---|---|
| CN | 103699494 A | 4/2014 |

(Continued)

OTHER PUBLICATIONS

Huang, C., et al. "Erasure Coding in Windows Azure Storage," USENIX ATC12: Proceedings of the 2012 USENIX conference on Annual Technical Conference, Jun. 2012, 12 pages.

*Primary Examiner* — Ruay Ho
(74) *Attorney, Agent, or Firm* — Conley Rose, P.C.

(57) ABSTRACT

A computing node in a storage system is configured to send an instruction of migration of a parity fragment of a plurality of data fragments from a first-level storage medium to a second-level storage medium, where performance of the second-level storage medium is lower than the first-level storage medium.

20 Claims, 5 Drawing Sheets

(56) References Cited

U.S. PATENT DOCUMENTS

| | | | |
|---|---|---|---|
| 2007/0130423 A1 | 6/2007 | Liu et al. | |
| 2012/0198153 A1* | 8/2012 | Fuente | G06F 3/0647 |
| | | | 711/114 |
| 2014/0380125 A1 | 12/2014 | Calder et al. | |
| 2015/0121169 A1 | 4/2015 | Iliadis et al. | |
| 2015/0242136 A1 | 8/2015 | Lin et al. | |
| 2016/0211869 A1* | 7/2016 | Blaum | H03M 13/35 |
| 2016/0380650 A1* | 12/2016 | Calder | H03M 13/2948 |
| | | | 714/766 |
| 2017/0090798 A1 | 3/2017 | Hassner et al. | |
| 2017/0329552 A1* | 11/2017 | Baldwin | G06F 3/0685 |
| 2018/0011640 A1* | 1/2018 | Takegawa | G06F 3/0685 |
| 2018/0039425 A1* | 2/2018 | Li | G06F 3/064 |
| 2018/0165034 A1 | 6/2018 | Danilov et al. | |
| 2019/0129649 A1 | 5/2019 | Zhong | |
| 2020/0278913 A1* | 9/2020 | Bakre | G06F 11/1088 |

FOREIGN PATENT DOCUMENTS

| | | |
|---|---|---|
| CN | 103744620 A | 4/2014 |
| CN | 105393225 A | 3/2016 |
| CN | 105487823 A | 4/2016 |
| CN | 106201338 A | 12/2016 |
| CN | 106383665 A | 2/2017 |
| CN | 106776111 A | 5/2017 |
| CN | 107436733 A | 12/2017 |

\* cited by examiner

FRAGMENT MANAGEMENT METHOD AND FRAGMENT MANAGEMENT APPARATUS

CROSS-REFERENCE TO RELATED APPLICATION

This application is a continuation of U.S. patent application Ser. No. 16/718,976, filed on Dec. 18, 2019, which is a continuation of International Patent Application No. PCT/CN2018/075188 filed on Feb. 3, 2018, which claims priority to Chinese Patent Application No. 201710515966.2 filed on Jun. 29, 2017. All of the aforementioned patent applications are hereby incorporated by reference in their entireties.

TECHNICAL FIELD

The present disclosure relates to computer technologies, and in particular, to the storage field.

BACKGROUND

Distributed storage modes such as cloud storage are increasingly popular. With explosive growth of information, a scale of data of a user in a cloud storage system becomes larger. An increasing data volume causes costs pressure on both a storage service provider and the user.

To improve data reliability, redundancy is performed on data using an erasure code (EC) technology in the cloud storage system. The redundant data is divided into a data fragment and a parity fragment (which are collectively referred to as a fragment). When a total quantity of damaged fragments does not exceed a threshold, for any quantity of fragments are damaged, a damaged fragment can be reconstructed based on an undamaged fragment. Further, in addition to the EC, a local reconstruction code (LRC) technology may be used. In the LRC technology, the parity fragment includes a local parity fragment and a global parity fragment. The local parity fragment may be used to recover a fragment when there is a small quantity of damaged fragments in a data center, and the global parity fragment may be used to recover data in an EC manner when there is a relatively large quantity of damaged fragments. The data fragment and the parity fragment may be distributed in a plurality of data centers. The local parity fragment protects data in the data center, and when a data center is faulty, the global parity fragment ensures that data can be recovered.

The parity fragment can improve data reliability. However, the parity fragment occupies a large amount of storage space. When an expensive high-speed storage medium is occupied, use costs of the user are greatly increased.

SUMMARY

According to a first aspect, the present disclosure provides an implementation of a fragment management method. The method may be applied to a distributed storage system, where the distributed storage system includes a computing node and at least one storage node, the storage node includes at least one storage medium, the distributed storage system includes a plurality of storage media, different fragments are stored in different storage media, both a data fragment and a first parity fragment are located in a first-level storage medium, and the method includes reading, by the computing node, metadata of the first parity fragment to obtain a first storage location in which the first parity fragment is located, selecting, by the computing node, a second storage location, where the second storage location is located in a second-level storage medium, a read speed of the second-level storage medium is lower than that of the first-level storage medium, and the second storage location has idle space, sending, by the computing node, a migration instruction to a storage node in which the first parity fragment is located to instruct the storage node in which the first parity fragment is located to send the first parity fragment to a storage node in which the second storage location is located, storing, by the storage node in which the second storage location is located, the first parity fragment in the second storage location, and instructing, by the computing node to update information about the second storage location to the metadata of the first parity fragment.

According to the method, a parity fragment of EC or a global parity fragment of LRC may be migrated from a high-speed storage medium with relatively high costs to a low-speed storage medium with relatively low costs, thereby reducing occupation of the high-speed storage medium.

In a first optional solution of the first aspect, the method further includes reading, by the computing node, metadata of a second parity fragment to obtain a third storage location in which the second parity fragment is located, selecting, by the computing node, a fourth storage location, where the fourth storage location is located in a third-level storage medium, a read/write speed of the third-level storage medium is higher than that of the second-level storage medium and is lower than that of the first-level storage medium, and the fourth storage location has idle space, sending, by the computing node, a migration instruction to a storage node in which the second parity fragment is located to instruct the storage node in which the second parity fragment is located to send the second parity fragment to a storage node in which the fourth storage location is located, storing, by the storage node in which the fourth storage location is located, the second parity fragment in the fourth storage location, and instructing, by the computing node, to update information about the fourth storage location to the metadata of the second parity fragment.

According to the method, a local parity fragment of LRC may be migrated from a high-speed storage medium with relatively high costs to a low-speed storage medium with relatively low costs, thereby reducing occupation of the high-speed storage medium. In addition, considering that usage of the local parity fragment of the LRC is higher than that of the global parity fragment of the LRC, a read/write speed of an in-migration storage medium of the local parity fragment of the LRC is higher than a read/write speed of an in-migration storage medium of the global parity fragment of the LRC.

Optionally, in a first optional solution of the first aspect, the data fragment, the first parity fragment, and the second parity fragment meet an LRC algorithm, where the first parity fragment is a global parity fragment in the LRC algorithm, and the second parity fragment is a local parity fragment in the LRC algorithm.

In a second optional solution of the first aspect, the method includes receiving, by the computing node, a data write request, dividing target data included in the data write request into data fragments, and generating a global parity fragment and a local parity fragment based on the data fragments and according to an LRC algorithm, where the global parity fragment is used to check a plurality of data fragments, and the local parity fragment is used to check some of the plurality of data fragments.

This solution describes a process of generating the data fragment, the local parity fragment, and the global parity fragment based on the LRC algorithm and a parity relationship between these fragments.

In a third optional solution of the first aspect, the data fragment and the first parity fragment meet an EC algorithm, and the method further includes receiving, by the computing node, a data write request, dividing target data included in the data write request into data fragments, and generating the first parity fragment based on the data fragments and according to the EC algorithm.

This solution describes a process of generating the data fragment and the parity fragment (which is also referred to as a "global parity fragment" in this application) based on the EC algorithm and a parity relationship between these fragments.

According to a second aspect, the present disclosure provides an embodiment of a computing node. The computing node includes a processor unit and a memory, the memory is configured to store a computer program, and by running the computer program, the processor unit is configured to read metadata of a first parity fragment, to obtain a first storage location in which the first parity fragment is located, select a second storage location, where the second storage location is located in a second-level storage medium, a read speed of the second-level storage medium is lower than that of the first-level storage medium, and the second storage location has idle space, send a migration instruction to a storage node in which the first parity fragment is located to instruct the storage node in which the first parity fragment is located to migrate the first parity fragment to the second storage location, and update information about the second storage location to the metadata of the first parity fragment after the migration is completed.

In a first possible implementation of the second aspect, the processor is further configured to read metadata of the second parity fragment to obtain a third storage location in which the second parity fragment is located, select a fourth storage location, where the fourth storage location is located in a third-level storage medium, a read speed of the third-level storage medium is higher than that of the second-level storage medium and is lower than that of the first-level storage medium, and the fourth storage location has idle space, send a migration instruction to a storage node in which the second parity fragment is located to instruct the storage node in which the second parity fragment is located to migrate the second parity fragment to the fourth storage location, and update information about the fourth storage location to the metadata of the first parity fragment after the migration is completed.

Optionally, in the first possible implementation of the second aspect, a data fragment, the first parity fragment, and the second parity fragment meet an LRC algorithm, where the first parity fragment is a global parity fragment in the LRC algorithm, and the second parity fragment is a local parity fragment in the LRC algorithm.

In a second possible implementation of the second aspect, the processor is further configured to receive a data write request, divide target data included in the data write request into data fragments, and generate the global parity fragment and the local parity fragment based on the data fragments and according to an LRC algorithm, where the global parity fragment is used to check a plurality of data fragments, and the local parity fragment is used to check some of the plurality of data fragments.

In a third possible implementation of the second aspect, a data fragment and the first parity fragment meet an EC algorithm, and the processor is further configured to receive a data write request, divide target data included in the data write request into data fragments, and generate the first parity fragment based on the data fragments and according to the EC algorithm.

In the second aspect and each possible implementation of the second aspect, a resolved calculation problem and a beneficial effect are similar to those in the embodiments corresponding to the first aspect, and therefore details are not described again.

According to a third aspect, the present disclosure provides an embodiment of a fragment management method, where the method includes receiving, by a computing node, a data unit using an interface, and generating a data fragment based on the data unit, generating a first parity fragment based on the data fragment, selecting storage space in a first-level storage medium as a data fragment storage location, selecting storage space in a second-level storage medium as a first parity fragment storage location, where a read/write speed of the second-level storage medium is lower than a read/write speed of the first-level storage medium, and sending the data fragment and the first parity fragment to the selected storage locations, to store the data fragment and the first parity fragment, where a write request of the data fragment includes the data fragment and the data fragment storage location, and a write request of the first parity fragment includes the first parity fragment and the first parity fragment storage location.

Compared with the solutions of the first/second aspect, in this implementation, after fragments are generated, the fragments are directly sent to different levels of storage media for storage. Therefore, no "migration" operation needs to be performed, and an effect is directly equivalent to the effect of the migration operation performed in the solutions of the first/second aspect. Therefore, efficiency of storing a fragment is further improved.

In a first possible implementation of the third aspect, the method further includes generating a second parity fragment based on the data fragment, where the data fragment, the first parity fragment, and the second parity fragment meet an LRC algorithm, the first parity fragment is a global parity fragment in the LRC algorithm, and the second parity fragment is a local parity fragment in the LRC algorithm, selecting storage space in a third-level storage medium as a second parity fragment storage location, where a read/write speed of the third-level storage medium is lower than the read/write speed of the first-level storage medium and is higher than or equal to the read/write speed of the second-level storage medium, and sending a data write request to the selected storage location to store the second parity fragment, where a write request of the second parity fragment includes the second parity fragment and the second parity fragment storage location.

This solution describes a relationship between the data fragment, the global parity fragment, and the local parity fragment based on the LRC algorithm.

According to a fourth aspect, the present disclosure provides a computing node. The computing node includes a processor unit and a memory, where the memory stores a computer program, and by running the computer program, the processor unit is configured to receive a data unit using an interface, and generate a data fragment based on the data unit, generate a first parity fragment based on the data fragment, select storage space in a first-level storage medium as a data fragment storage location, and select storage space in a second-level storage medium as a first parity fragment storage location, where a read/write speed of the second-level storage medium is lower than a read/write speed of the first-level storage medium, and send the data fragment and the first parity fragment to the selected storage locations to store the data fragment and the first parity fragment, where the data fragment storage location is storage space in the first-level storage medium, and the first parity fragment storage location is storage space in the second-level storage medium.

Optionally, in a solution of the fourth aspect, the processor unit is further configured to generate a second parity fragment based on the data fragment, where the data fragment, the first parity fragment, and the second parity fragment meet an LRC algorithm, the first parity fragment is a global parity fragment in the LRC algorithm, and the second parity fragment is a local parity fragment in the LRC algorithm, select storage space in a third-level storage medium as a second parity fragment storage location, where a read/write speed of the third-level storage medium is lower than the read/write speed of the first-level storage medium and is higher than or equal to the read/write speed of the second-level storage medium, and send the data fragment and the second parity fragment to the selected storage location, to store the second parity fragment, where the second parity fragment storage location is storage space in the third-level storage medium.

In the fourth aspect and the optional solutions of the fourth aspect, a beneficial effect and a resolved technical problem are the same as those in the third aspect and the optional solutions of the third aspect. Details are not described again.

According to a fifth aspect, the present disclosure further provides an embodiment of a storage medium. The storage medium may store program code, and by running the stored code, a computer/server/distributed storage system may perform the first aspect and the possible optional manners of the first aspect, or perform the third aspect and the possible optional manners of the third aspect.

According to a sixth aspect, the present disclosure further provides an embodiment of a fragment management apparatus. The fragment management apparatus may be software or hardware, the fragment management apparatus includes modules, and each module has a function corresponding to the foregoing method embodiment.

For example, an embodiment provides a fragment management apparatus, including a reading module, a location selection module, a migration module, and a metadata management module. The reading module is configured to read metadata of the first parity fragment to obtain a first storage location in which the first parity fragment is located. The location selection module is configured to select a second storage location, where the second storage location is located in a second-level storage medium, a read speed of the second-level storage medium is lower than that of the first-level storage medium, and the second storage location has idle space. The migration module is configured to send a migration instruction to a storage node in which the first parity fragment is located to instruct the storage node in which the first parity fragment is located to migrate the first parity fragment to the second storage location.

For another example, another embodiment also provides a fragment management apparatus, and the fragment management apparatus includes a fragment module, a location selection module, and a storage module. The fragment module is configured to receive a data unit, and generate a data fragment based on the data unit, and generate a first parity fragment based on the data fragment. The location selection module is configured to select storage space in a first-level storage medium as a data fragment storage location, and select storage space in a second-level storage medium as a first parity fragment storage location, where a read speed of the second-level storage medium is lower than a read speed of the first-level storage medium. The storage module is configured to send the data fragment and the first parity fragment to the selected storage locations, to store the data fragment and the first parity fragment, where a write request of the data fragment includes the data fragment and the data fragment storage location, and a write request of the first parity fragment includes the first parity fragment and the first parity fragment storage location. The metadata management module is configured to record a storage location of a fragment in metadata of the fragment.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and persons of ordinary skill in the art may still derive other drawings from these accompanying drawings.

DESCRIPTION OF EMBODIMENTS

Figure 1:
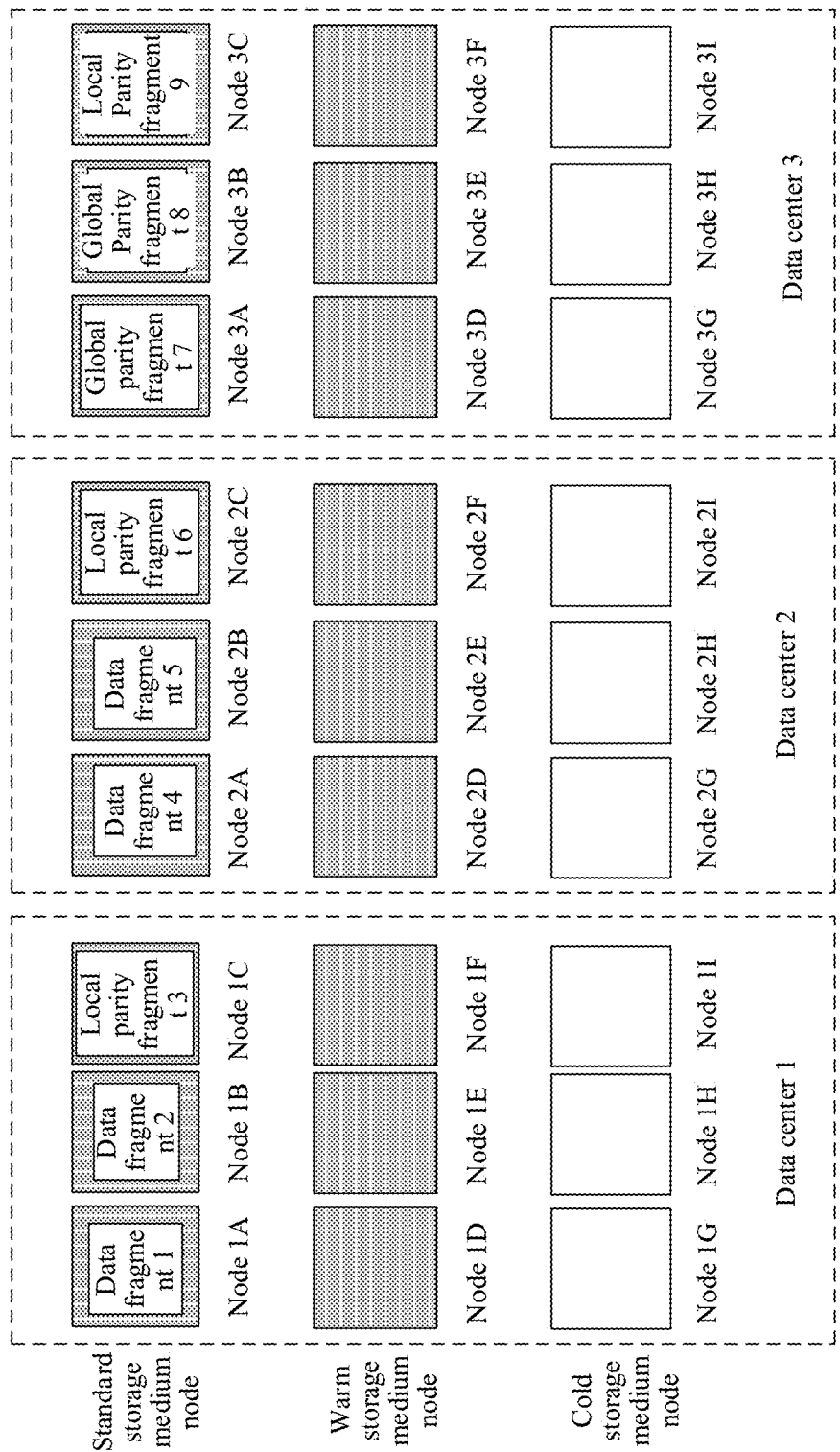
FIG. 1 is a fragment distribution diagram before migration according to an embodiment of a fragment management method.

The terms "including", "comprising", or any other variant thereof mentioned in the specification, claims, and the accompanying drawings of the present disclosure, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. The terms "first", "second", "third", and "fourth" are used to distinguish between different objects instead of describing a specific sequence.

The embodiments of the present disclosure may be applied to a distributed storage system scenario. The distributed storage system in the embodiments of the present disclosure is a storage system that includes a plurality of storage media (the storage media such as a solid state drive (SSD), a disk, a universal serial bus (USB) flash drive, a compact disc erasable, and a magnetic tape). The storage media may be located in a same node or a plurality of nodes. Each storage medium may store one data fragment or one parity fragment. The parity fragment is obtained through parity calculation using one or more data fragments. A cloud storage system is also a distributed storage system. In the cloud storage system, storage nodes are allocated to a plurality of data centers, and each data center includes at least one storage node.

Storage locations may be different. The distributed storage system includes a plurality of storage nodes, and the storage node is, for example, a computer, a server, or storage array including a storage controller and a storage medium. A data unit (for example, a file or a file fragment) is divided into a plurality of data fragments. EC calculation is performed on data fragments that are from a same data unit or from different data units to generate a parity (redundancy) fragment. The data fragments and the parity fragment are collectively referred to as fragments, and these fragments (the data fragment and the parity fragment) are dispersedly stored in different storage nodes, or are dispersedly stored in different storage media. If data of some fragments is lost or damaged, the faulty fragments may be recovered using a remaining fragment according to the EC algorithm. A larger quantity of parity fragments indicates a larger quantity of faulty fragments that can be recovered according to the EC algorithm.

An LRC technology may be considered as an extended form of the EC, and the LRC can improve fragment recovery efficiency. In the LRC technology, another type of parity fragment is provided. This parity fragment is obtained through calculation using some data fragments, and performs parity protection on only some data fragments. If the data fragments are divided into several data fragment groups, a group of data fragments and a corresponding parity fragment generated based on the group of data fragments jointly form a parity group. The parity group may be stored in a same data center or a same storage node. For a faulty fragment in the parity group, if a quantity of faulty fragments is not greater than a quantity of local parity fragments, the faulty fragment may be recovered using a remaining fragment in the parity group. Because physical storage locations of fragments in a same parity group are close to each other, a recovery speed is quite high. Such a parity fragment is referred to as a local parity fragment.

The LRC technology may further include a global parity fragment, and the global parity fragment is used to check all data fragments. In a combination of the data fragments and the global parity fragment, if a quantity of faulty fragments is not greater than a quantity of global parity fragments, the faulty fragment may be recovered using a check algorithm, and the check algorithm may be the same as the EC check algorithm. For example, when there is a large quantity of faulty fragments in a same parity group, and it is difficult to recover the faulty fragments using a remaining fragment in the group, the global parity fragment may be usually used for recovery.

To distinguish between the foregoing two types of parity fragments, the parity fragment in the EC technology and the global parity fragment in the LRC technology each are referred to as a "global parity fragment", and the newly-added parity fragment (which is used to check only some data fragments) in the LRC technology is referred to as a "local parity fragment".

For ease of understanding, refer to the following application scenario example of the LRC in FIG. 1. A distributed storage system includes a data center 1, a data center 2, and a data center 3. Each data center includes a plurality of storage nodes. Data fragments in the distributed storage system include a data fragment 1, a data fragment 2, and a local parity fragment 3, a data fragment 4, a data fragment 5, and a local parity fragment 6, and a global parity fragment 7, a global parity fragment 8, and a local parity fragment 9.

A local parity group 1 includes three fragments, and the three fragments are respectively the local parity fragment 3, the data fragment 1, and the data fragment 2. The local parity fragment 3 is a parity fragment of the data fragment 1 and the data fragment 2, and the three fragments are stored in different storage nodes of the data center 1.

A local parity group 2 includes three fragments, and the three fragments are respectively the local parity fragment 6, the data fragment 4, and the data fragment 5. The local parity fragment 6 is a parity fragment of the data fragment 4 and the data fragment 5, and the three fragments are stored in different storage nodes of the data center 2.

A local parity group 3 includes three fragments, and the three fragments are respectively the local parity fragment 9, the global parity fragment 7, and the global parity fragment 8. The local parity fragment 9 is a parity fragment of the global parity fragment 7 and the global parity fragment 8, and the three fragments are stored in different storage nodes of the data center 3.

A global parity group includes six fragments, and the six fragments are respectively the global parity fragment 7, the global parity fragment 8, the data fragment 1, the data fragment 2, the data fragment 4, and the data fragment 5.

The global parity fragment 7 and the global parity fragment 8 are parity fragments of the data fragment 1, the data fragment 2, the data fragment 4, and the data fragment 5. The global parity fragment 7 and the global parity fragment 8 may be located in the data center 3.

It can be learned that the global parity fragment is used to check a plurality of data fragments, and the local parity fragment is used to check some of the plurality of data fragments (which are usually less than the plurality of data fragments). For example, data fragments checked using the global parity fragment are divided into a plurality of groups, and each data fragment group has at least one local parity fragment. Data fragments that different local parity fragments are responsible for checking may be located in different physical locations, for example, located in different data centers, different equipment rooms, different shelves, and different storage nodes.

It should be specially noted that the global parity fragment also has a corresponding local parity fragment, and the corresponding local parity fragment is used to check the global parity fragment. Although the local parity fragment of the global parity fragment has a word "local" in the name, read frequency of the local parity fragment of the global parity fragment is lower than that of the local parity fragment of the data fragment. Therefore, unless otherwise specified, in each embodiment of this application, a migration manner of the local parity fragment of the global parity fragment is not the same as that of the local parity fragment of the data fragment, but is the same as that of the global parity fragment.

In any data center, if one fragment is faulty, the faulty fragment may be recovered using the remaining two fragments. If any two fragments in the entire storage system are faulty, the faulty fragments may be recovered using the remaining fragments in the storage system. If the three local parity fragments are ignored, the global parity group may be considered as an EC parity group.

It can be learned that compared with the EC technology, the LRC technology further improves data reliability and a fragment recovery speed.

In the embodiments of the present disclosure, the EC algorithm/LRC algorithm is an algorithm for calculating a parity fragment of a data fragment according to a principle of the EC/LRC, or is an algorithm for recovering a damaged fragment based on an undamaged fragment according to a principle of the EC/LRC when a fragment is damaged.

However, both the LRC technology and the EC technology increase occupation of storage space as data reliability is improved. Different storage nodes in one data center may use different types of storage media. For example, a same data center includes a storage node having a standard storage medium, a storage node having a warm storage medium, and a storage node having a cold storage medium. The three types of storage media provide different read/write speeds. The standard storage medium (for example, SSD) has a highest read/write speed, the warm storage medium (for example, a high-speed disk) has a medium read/write speed, and the cold storage medium (for example, a low-speed disk) has a lowest read/write speed. Correspondingly, the three types of storage media have different costs. The standard storage medium has highest costs, the warm storage medium has medium costs, and the cold storage medium has lowest costs. Referring to FIG. 1, in each data center, a standard storage medium is located in the first line, a warm storage medium node is located in the second line, and a cold storage medium node is located in the third line. FIG. 1 shows three layers using an example. In actual application, there may be more layers or only two layers.

In addition, it should be noted that different types of storage media may be used in one node. For example, a same storage node includes the standard storage medium, the warm storage medium, and the cold storage medium. Different fragments are distributed in different storage media, but may be located in a same storage node. Different nodes in a data center in FIG. 1 are understood as a plurality of memories in at least one node. This is a description of this scenario. Because there is no essential difference between the two scenarios, details are not described. The following describes only the scenario described in FIG. 1.

Figure 2:
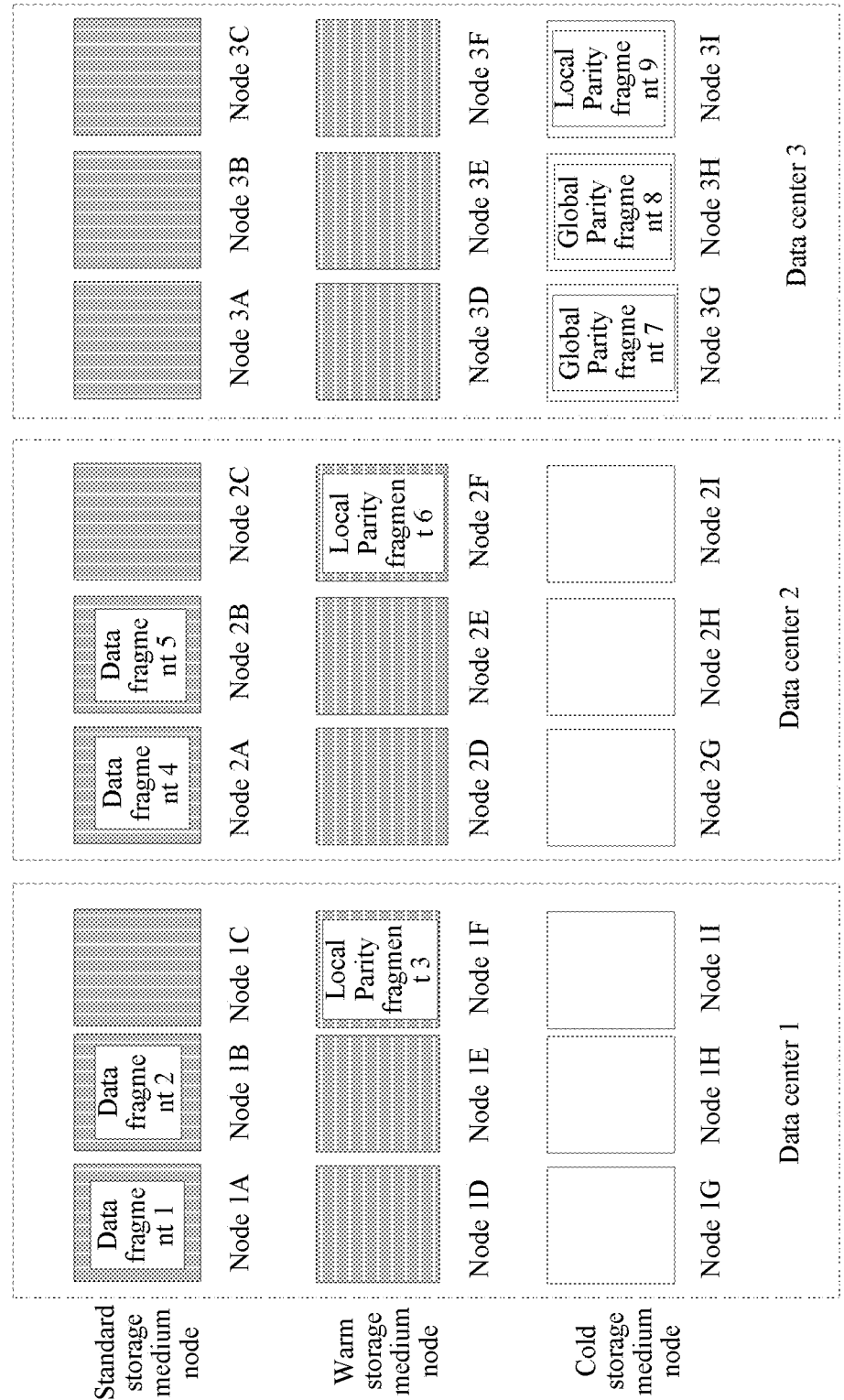
FIG. 2 is a fragment distribution diagram after migration according to an embodiment of a fragment management method.

For a data fragment stored in the standard storage medium, a parity fragment of the data fragment also exists in a same type of storage medium. This undoubtedly occupies a large quantity of expensive standard storage media. Considering that usage of a parity fragment is not high, this embodiment of the present disclosure provides an innovative idea. A storage location of fragments is managed at a finer granularity, and a parity fragment is migrated to a lower-cost storage medium. For example, referring to FIG. 2, the data fragment is retained in the standard storage node. Considering that read/write frequency of the local parity fragment is lower than that of the data fragment, the local parity fragment may be migrated to the warm storage medium node with a relatively low read/write speed. However, read/write frequency of the global parity fragment is lowest, and therefore the global parity fragment may be migrated to the cold storage medium node with a lowest read/write speed, and the local parity fragment of the global parity fragment may also be migrated to the cold storage medium node. It should be noted that a focus of this embodiment is to migrate a parity fragment between media with different speeds. Media of nodes in FIG. 2 are unified. Therefore, migrating a fragment to the cold storage medium node means migrating data to the cold storage medium. For a case in which a same node has different levels of media, allocation and migration may be performed without crossing nodes, for example, a parity fragment is migrated from a standard storage medium to a warm storage medium of a same node.

Certainly, there may further be more variants. For example, both two types of parity fragments are migrated to the warm storage medium node or migrated to the cold storage medium node.

Figure 3:
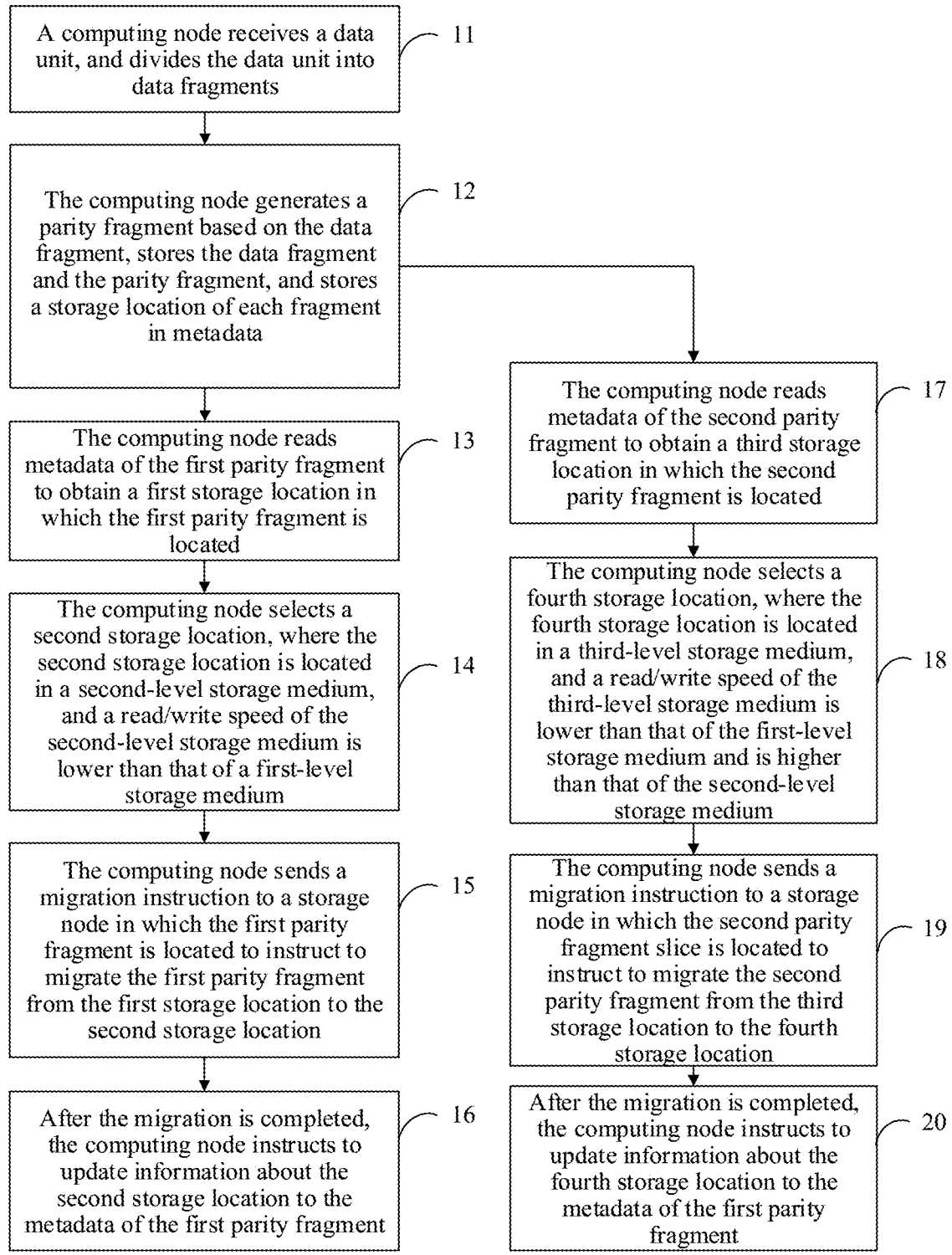
FIG. 3 is a flowchart of an embodiment of a fragment management method.

The following describes an embodiment of a fragment management method according to the present disclosure, and further describes a case in which a parity fragment is migrated, thereby reducing occupation of a high-cost storage medium with respect to FIG. 3. This embodiment may be applied to a distributed storage system, and the distributed storage system includes a computing node and a storage node. The computing node has a computing function, and the storage node is mainly configured to store data. The computing node and the storage node may be different physical nodes, or functions of the computing node and the storage node may be integrated into one physical node.

The computing node is, for example, a computer, a server, or a storage controller, or may be a virtual machine. The computing node includes at least one processor and at least one memory, where the memory stores program code, and the processor performs the following steps by running the program code. The storage node is, for example, a computer, a server, or a storage controller, or may be a virtual machine. The storage node includes at least one processor, at least one memory, and at least one storage medium. The memory stores program code. The processor performs a function of the storage node by running the program code (for example, receives a fragment sent by the computing node, and then stores the fragment in the storage medium). The storage medium is configured to store a fragment and/or metadata.

Step 11. The computing node receives a data unit, and divides the data unit into data fragments.

It should be noted that if the data unit is relatively small and is smaller than or equal to a size of the fragment, the data fragment may be directly obtained without division.

Step 12. The computing node generates a parity fragment based on the data fragment, stores the data fragment and the parity fragment, and stores a storage location of each fragment in metadata.

For an EC algorithm, one or more parity fragments that are generated using the data fragment are referred to as a first parity fragment.

For an LRC algorithm, a parity fragment that is generated using the data fragment includes a local parity fragment and a global parity fragment. To distinguish between the two types of parity fragments, the global parity fragment is referred to as a first parity fragment, and the local parity fragment is referred to as a second parity fragment.

The computing node sends the data fragment and the parity fragment to each storage medium for storage. These storage media belong to a same level (mainly indicating that read/write speeds belong to a same level). As described above, there are two cases, Case 1: Each fragment is stored in a storage medium located in a different storage node. Case 2: Some or all fragments are stored in storage media located in a same storage node. In comparison, the former case has higher reliability. Alternatively, there may even be a case in which different fragments are stored in storage nodes in different data centers, and this case is more reliable.

The storage location of each fragment is stored in metadata of each fragment. The metadata may be stored in the storage node. For example, a cloud storage system includes a plurality of data centers, each data center includes at least one storage node, and metadata of fragments in a same data center is stored in a same storage node of the data center.

Step 13. The computing node reads metadata of a first parity fragment to obtain a storage location in which the first parity fragment is located, that is, an out-migration storage location of the first parity fragment.

For example, the storage location is described as [storage node identifier (ID), logical address], and the first parity fragment may be read based on the storage location. Alternatively, the storage location is described as [storage node ID, fragment ID]. A storage node that stores the first parity fragment records a correspondence between a fragment ID and a logical address/physical address. Therefore, after receiving the storage location, the storage node may obtain the logical address/physical address of a fragment based on the fragment ID.

This step is performed before a parity fragment is migrated. The parity fragment and the data fragment are often located in a same type of storage medium, for example, a first type of storage medium.

Step 14. The computing node selects a second storage location as an in-migration storage location of the first parity fragment. The second storage location is located in a second-level storage medium, and a read/write speed of the second-level storage medium is lower than that of a first-level storage medium.

A storage medium in which the second storage location is located and a storage medium in which a first storage location is located may be located in a same storage node, or may be located in different storage nodes.

The second storage location is located in a second type of storage medium or a third type of storage medium. Read/write speeds of the first type of storage medium, the second type of storage medium, and the third type of storage medium successively decrease. To reduce occupation of an expensive high-speed storage medium and reduce costs, a storage medium with a relatively low read/write speed is used as an in-migration destination of a parity fragment.

In addition to the storage location description manner mentioned in step 13, the second storage location is used as an in-migration storage location. If the second storage location includes storage media at a same level, the storage location may be described as only [storage node ID], and a storage node in which the second storage location is located independently selects a storage medium as an in-migration destination of a fragment.

Step 15. The computing node sends a migration instruction to a storage node (an out-migration node) in which the first parity fragment is located to instruct to migrate the first parity fragment from the first storage location to the second storage location.

If the two locations are located in one storage node, the computing node sends the instruction to the out-migration node. The out-migration node migrates the first parity fragment from the first storage location to the second storage location.

If the two locations are located in different storage nodes, the computing node sends the instruction to the out-migration node. The out-migration node sends the first parity fragment to an in-migration node (the storage node in which the second storage location is located). After receiving the first parity fragment, the in-migration node stores the first parity fragment in the second storage location.

In another implementation, the computing node sends the instruction to the out-migration node to instruct to migrate the first parity fragment from the first storage location to the in-migration node, but the second storage location is not indicated. After the out-migration node sends the first parity fragment to the in-migration node, the in-migration node allocates a storage medium that meets a performance requirement (for example, a read/write speed). For example, if any storage medium of the in-migration node meets the performance requirement, the in-migration node may select any fragment location. If some storage media of the in-migration node do not meet the performance requirement, the computing node may directly or indirectly notify the in-migration node of the performance requirement such that the in-migration node selects a storage medium that meets the performance requirement.

Step 16. After the migration is completed, the computing node instructs to update information about the second storage location to the metadata of the first parity fragment.

In the foregoing step 12, storage of the metadata is described. In this step, the metadata is updated, and a new location (the second storage location) of the first parity fragment is updated to the metadata of the first parity fragment in order to subsequently read or modify the first parity fragment.

If a check algorithm is LRC, a local parity fragment of a global parity fragment also follows the migration solution in steps 13 to 16. In addition, this embodiment further includes the following steps 17 to 20. Steps 17 to 20 are similar to steps 13 to 16, and therefore details are not described again. A difference is that a migrated object is a local parity fragment of a data fragment (the local parity fragment of the global parity fragment is not included). The out-migration location changes from the first storage location to a third storage location. The in-migration location changes from the second storage location to a fourth storage location. A read/write speed of a storage medium (the third type of storage medium) in which the third storage location is located is lower than that of a storage medium (the first type of storage medium) in which the data fragment is located, and is higher than or equal to that of the storage medium (the second type of storage medium) in which the global parity fragment is located.

It should be noted that in this embodiment of the present disclosure, "read/write" includes any one of three cases, "read", "write", and "read and write".

Figure 4:
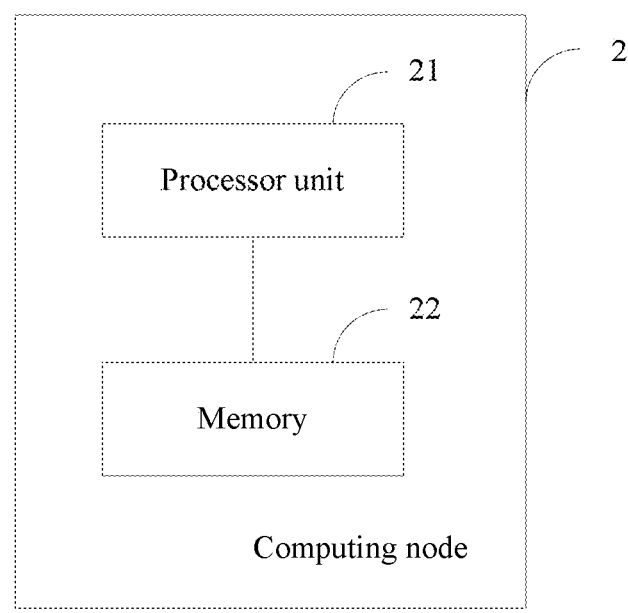
FIG. 4 is a structural diagram of hardware of an embodiment of a computing node.

FIG. 4 is an embodiment of a computing node 2. The computing node 2 may perform the foregoing fragment management method. Thus, only brief description for the computing node 2 is provided.

The computing node 2 is applied to a distributed storage system. The distributed storage system includes the computing node and at least one storage node. The storage node includes at least one storage medium. The distributed storage system includes a plurality of storage media. Different fragments are stored in different storage media. Both a data fragment and a first parity fragment are located in a first-level storage medium. The computing node includes a processor unit 21 and a memory 22, and may further include an external interface (not shown) and a storage medium (not shown). The processor unit 21 is, for example, a single-core central processing unit (CPU), a multi-core CPU, a combination of a plurality of CPUs, or a field programmable gate array (FPGA). The memory 22 is, for example, a volatile storage medium (such as a random access memory (RAM)) or a non-volatile storage medium (such as a hard disk or an SSD), or may be a part of a storage medium. The memory 22 is configured to store a computer program.

By running the computer program, the processor unit 21 is configured to read metadata of the first parity fragment to obtain a first storage location in which the first parity fragment is located, select a second storage location, where the second storage location is located in a second-level storage medium, a read speed of the second-level storage medium is lower than that of the first-level storage medium, and the second storage location has idle space, send a migration instruction to a storage node in which the first parity fragment is located to instruct the storage node in which the first parity fragment is located to migrate the first parity fragment to the second storage location, and update information about the second storage location to the metadata of the first parity fragment after the migration is completed.

The processor unit 21 is further configured to read metadata of the second parity fragment, to obtain a third storage location in which the second parity fragment is located, select a fourth storage location, where the fourth storage location is located in a third-level storage medium, a read speed of the third-level storage medium is higher than that of the second-level storage medium and is lower than that of the first-level storage medium, and the fourth storage location has idle space, send a migration instruction to a storage node in which the second parity fragment is located to instruct the storage node in which the second parity fragment is located to migrate the second parity fragment to the fourth storage location, and update information about the fourth storage location to the metadata of the first parity fragment after the migration is completed.

The data fragment, the first parity fragment, and the second parity fragment meet an LRC algorithm, where the first parity fragment is a global parity fragment in the LRC algorithm, and the second parity fragment is a local parity fragment in the LRC algorithm.

The processor unit 21 is further configured to receive a data write request, divide target data included in the data write request into data fragments, and generate the global parity fragment and the local parity fragment based on the data fragments and according to an LRC algorithm.

The global parity fragment is used to check a plurality of data fragments, and the local parity fragment is used to check some of the plurality of data fragments.

When the data fragment and the first parity fragment meet an EC algorithm, the processor is further configured to receive a data write request, divide target data included in the data write request into data fragments, and generate the first parity fragment based on the data fragments and according to the EC algorithm.

In addition, the present disclosure further provides an embodiment of a fragment management apparatus. The fragment management apparatus may be hardware (for example, a computing node) or may be software (for example, a computer program running in a computing node). The fragment management apparatus may perform the foregoing fragment management method. Thus, only brief description for the fragment management apparatus is provided.

The fragment management apparatus includes a reading module, a location selection module, a migration module, and a metadata management module.

The reading module is configured to read metadata of the first parity fragment, to obtain a first storage location in which the first parity fragment is located.

The location selection module is configured to select a second storage location, where the second storage location is located in a second-level storage medium, a read speed of the second-level storage medium is lower than that of the first-level storage medium, and the second storage location has idle space.

The migration module is configured to send a migration instruction to a storage node in which the first parity fragment is located, to instruct the storage node in which the first parity fragment is located to migrate the first parity fragment to the second storage location.

The metadata management module is configured to update information about the second storage location to the metadata of the first parity fragment.

Optionally, the modules are further configured to perform these functions. The reading module is further configured to read metadata of the second parity fragment, to obtain a third storage location in which the second parity fragment is located. The location selection module is further configured to select a fourth storage location, where the fourth storage location is located in a third-level storage medium, a read speed of the third-level storage medium is higher than that of the second-level storage medium and is lower than that of the first-level storage medium, and the fourth storage location has idle space. The migration module is further configured to send a migration instruction to a storage node in which the second parity fragment is located, to instruct the storage node in which the second parity fragment is located to migrate the second parity fragment to the fourth storage location. The metadata management module is further configured to update information about the fourth storage location to the metadata of the first parity fragment after the migration is completed.

Figure 5:
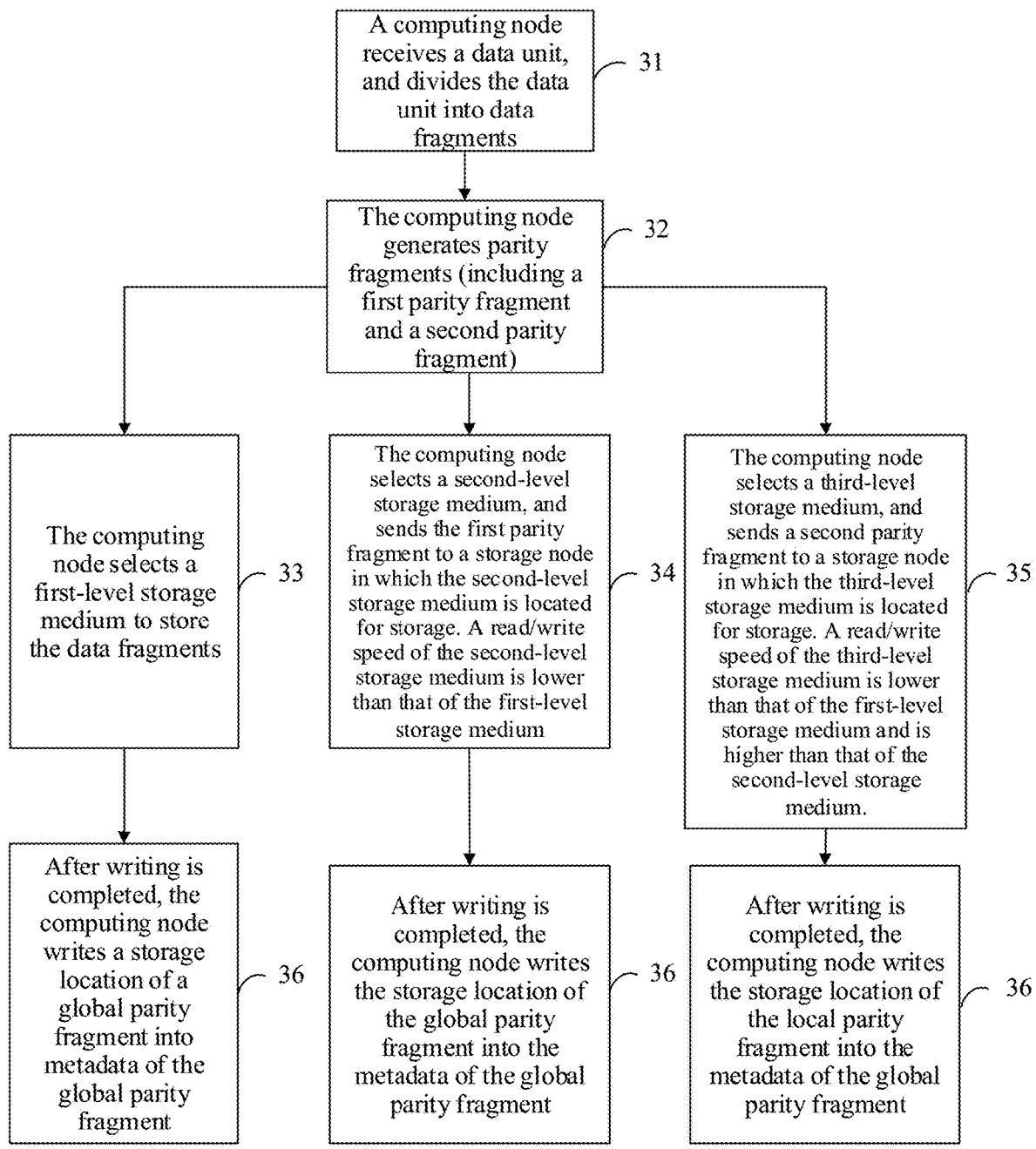
FIG. 5 is a flowchart of an embodiment of another fragment management method.

In the method embodiment shown in FIG. 3, after a parity fragment is generated, the parity fragment is first written into the first-level storage medium, and then the parity fragment that has been written into the first-level storage medium is migrated. A migration destination is the second-level storage medium/third-level storage medium with relatively low costs. FIG. 5 shows an embodiment of another fragment management method according to the present disclosure, and a difference between the embodiment shown in FIG. 5 and the foregoing manner is that after the parity fragment is generated, the parity fragment is directly written into the second-level storage medium/third-level storage medium with relatively low costs.

Compared with the foregoing manner, a migration step is omitted in the implementation described in FIG. 5, and therefore efficiency is higher. However, the foregoing manner also has its own advantage. To be specific, the write speed of the first-level storage medium is higher, and after the writing succeeds, that the write operation has been completed is notified to a host (a sender of the data unit). Therefore, the host may be responded more quickly. Especially, if the second-level storage medium/the third-level storage medium is located in a cold storage node, this advantage is more obvious. Because the cold storage node is usually in a power-off state, and is powered on only when data is written into the cold storage node, a response speed is quite low.

Step 31. A computing node receives a data unit from a host or a server using an external interface, and divides the data unit into data fragments.

It should be noted that if the data unit is relatively small and is smaller than or equal to a size of the fragment, the data fragment may be directly obtained without division (if the data unit is smaller than the size of the fragment, the data unit may reach the size of the fragment through zero padding).

Step 32. The computing node generates parity fragments based on the data fragments. The parity fragments include a first parity fragment and a second parity fragment.

For meanings of the first parity fragment and the second parity fragment, refer to the foregoing embodiment. For an EC algorithm, one or more parity fragments are generated using the data fragments. The parity fragment is also referred to as the first parity fragment. For an LRC algorithm, the parity fragments generated using the data fragments include a local parity fragment and a global parity fragment. In this embodiment, the first parity fragment is the global parity fragment, and the second parity fragment is the local parity fragment. The global parity fragment is used to check all data fragments, and the local parity fragment is used to check some data fragments.

Step 33. The computing node selects a first-level storage medium, and sends the data fragments to a storage node in which the first-level storage medium is located for storage. The first-level storage medium is a medium with a highest read/write speed.

Step 34. The computing node selects a second-level storage medium, and sends the first parity fragment to a storage node in which the second-level storage medium is located for storage. A read/write speed of the second-level storage medium is lower than that of the first-level storage medium.

As described above, in an EC scenario or an LRC scenario, the first parity fragment may parity the data fragments. In the EC scenario, the first parity fragment is briefly referred to as a fragment. In the LRC scenario, the first parity fragment is equivalent to a global parity fragment.

Step 35. The computing node selects a third-level storage medium, and sends a second parity fragment to a storage node in which the third-level storage medium is located for storage. A read/write speed of the third-level storage medium is lower than that of the first-level storage medium and is higher than that of the second-level storage medium. As described above, step 35 is an optional step. Step 35 is performed in the LRC scenario, and step 35 is not performed in the EC scenario.

Steps 33, 34, and 35 may be performed in any time sequence.

Step 36. After writing is completed, the computing node writes a storage location of a global parity fragment into metadata of the global parity fragment.

Compared with the method described in steps 11 to 16, a main difference in this embodiment is that the migration step is omitted, and is replaced with hierarchical storage that is directly performed on the data fragment and the parity fragment. For other content (for example, explanations of an algorithm and a node, a relationship between a parity fragment and a data fragment, a solution for selecting a storage location/node, and definitions of nouns), refer to the foregoing embodiments. For example, referring to step 15, in steps 33, 34, and 35, the computing node may specify only a storage node that is used to store a fragment, and does not specify a specific storage medium for storing the fragment, and the storage medium for storing the fragment is determined by the storage node that receives the fragment. For brevity, similar content is not described in this embodiment. For details, refer to the foregoing embodiments.

The present disclosure further provides a computing node, to implement the method described in steps 31 to 36. For description, refer to FIG. 4.

The computing node 2 includes a processor unit 21 and a memory 22, where the memory 22 stores a computer program. The computing node includes the processor unit 21 and the memory 22, and may further include an external interface (not shown) and a storage medium (not shown). The memory unit 21 is, for example, a single-core CPU, a multi-core CPU, a combination of a plurality of CPUs, or an FPGA. The memory 22 is, for example, a volatile storage medium (such as a RAM) or a non-volatile storage medium (such as a hard disk or an SSD), or may be a part of a storage medium. The memory 22 is configured to store the computer program.

By running the computer program, the processor unit 21 is configured to receive a data unit using an interface, and generate a data fragment based on the data unit, generate a first parity fragment based on the data fragment, select storage space in a first-level storage medium as a data fragment storage location, and select storage space in a second-level storage medium as a first parity fragment storage location, where a read speed of the second-level storage medium is lower than a read speed of the first-level storage medium, and send the data fragment and the first parity fragment to the selected storage locations, to store the data fragment and the first parity fragment, where the data fragment storage location is storage space in the first-level storage medium, and the first parity fragment storage location is storage space in the second-level storage medium.

Optionally, by running the computer program, the processor unit 21 is further configured to generate a second parity fragment based on the data fragment, where the data fragment, the first parity fragment, and the second parity fragment meet an LRC algorithm, the first parity fragment is a global parity fragment in the LRC algorithm, and the second parity fragment is a local parity fragment in the LRC algorithm, select storage space in a third-level storage medium as a second parity fragment storage location, where a read speed of the third-level storage medium is lower than the read speed of the first-level storage medium and is higher than or equal to the read speed of the second-level storage medium, and send the data fragment and the second parity fragment to the selected storage location, to store the second parity fragment, where the second parity fragment storage location is storage space in the third-level storage medium.

In addition, the present disclosure further provides an embodiment of a fragment management apparatus. The fragment management apparatus may be hardware (for example, a computing node) or may be software (for example, a computer program running in a computing node). The fragment management apparatus may perform the foregoing fragment management method. Because the fragment management apparatus corresponds to the fragment management method, only brief description is provided.

The fragment management apparatus includes a fragment module, a location selection module, and a storage module.

The fragment module is configured to receive a data unit, and generate a data fragment based on the data unit, and generate a first parity fragment based on the data fragment.

The location selection module is configured to select storage space in a first-level storage medium as a data fragment storage location, and select storage space in a second-level storage medium as a first parity fragment storage location, where a read speed of the second-level storage medium is lower than a read speed of the first-level storage medium.

The storage module is configured to send the data fragment and the first parity fragment to the selected storage locations, to store the data fragment and the first parity fragment, where a write request of the data fragment includes the data fragment and the data fragment storage location, and a write request of the first parity fragment includes the first parity fragment and the first parity fragment storage location.

The metadata management module is configured to record a storage location of a fragment in metadata of the fragment.

Optionally, the fragment module is further configured to generate a second parity fragment based on the data fragment, where the data fragment, the first parity fragment, and the second parity fragment meet an LRC algorithm, the first parity fragment is a global parity fragment in the LRC algorithm, and the second parity fragment is a local parity fragment in the LRC algorithm.

The location selection module is further configured to select storage space in a third-level storage medium as a second parity fragment storage location, where a read speed of the third-level storage medium is lower than the read speed of the first-level storage medium and is higher than or equal to the read speed of the second-level storage medium. The storage module is further configured to send a data write request to the selected storage location, to store the second parity fragment, where a write request of the second parity fragment includes the second parity fragment and the second parity fragment storage location.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The computer software product is stored in a storage medium and includes several instructions for instructing a computer device (which may be a personal computer, a server, or a network device, and may be further a processor in a computer device) to perform all or some of the steps of the foregoing methods described in the embodiments of the present disclosure. The foregoing storage medium may include any medium that can store program code, such as a USB flash drive, a removable hard disk, a magnetic disk, an optical disc, a read-only memory (ROM), or a RAM. That is, the present disclosure provides an embodiment of a storage medium. The storage medium is configured to record a computer program/software. By running the stored computer program/software, a computer/server/computing node/distributed storage system may perform the foregoing fragment management method embodiments.

What is claimed is:

1. A method implemented by a computing node, the method comprising:
    storing data fragments and a first parity fragment of the data fragments in a first-level storage media;
    migrating the first parity fragment from the first-level storage media to a second-level storage medium of the storage system and keeping the data fragments stored in the first-level storage media, wherein the first-level storage media is a high-speed storage medium, wherein the second-level is a low-speed storage medium, and wherein the first-level storage media and the second-level storage medium are different types of storage media;
    storing the first parity fragment in the second-level storage medium.

2. The method of claim 1, wherein the storage system further comprises a third-level storage medium, and wherein the fragment management method further comprises:
    migrating a second parity fragment from a first-level storage medium in the first-level storage media to the third-level storage medium, wherein performance of the third-level storage medium is between the performance of the second-level storage medium and the performance of the first-level storage media; and
    storing the second parity fragment in the third-level storage medium.

3. The method of claim 2, wherein the second parity fragment is configured to check a subset of the data fragments.

4. The method of claim 3, further comprising calculating the second parity fragment using a local reconstruction code (LRC) technology on the subset of the data fragments.

5. A storage system, comprising:
    first-level storage media configured to store data fragments and a first parity fragment of the data fragments;
    a second-level storage medium, wherein the first-level storage media is a high-speed storage medium, wherein the second-level is a low-speed storage medium, and wherein the first-level storage media and the second-level storage medium are different types of storage media; and
    a computing node coupled to the first-level storage media and the second-level storage medium and configured to send a first migration instruction for migrating the first parity fragment from the first-level storage media to the second-level storage medium while the data fragments remain located in the first-level storage media.

6. The storage system of claim 5, further comprising a third-level storage medium, wherein the first-level storage media is further configured to store a second parity fragment, wherein the computing node is further configured to send a second migration instruction for migrating the second parity fragment from the first-level storage media to the third-level storage medium, and wherein performance of the third-level storage medium is between the performance of the second-level storage medium and the performance of the first-level storage media.

7. The storage system of claim 6, wherein the first parity fragment is configured to check all of the data fragments, and wherein the second parity fragment is configured to check a subset of the data fragments.

8. The storage system of claim 7, wherein the computing node is further configured to calculate the second parity fragment using a local reconstruction code (LRC) technology on the subset of the data fragments.

9. The storage system of claim 5, wherein the data fragments and the first parity fragment meet an erasure code (EC) algorithm.

10. A method implemented by a computing node, the method comprising:
    sending data fragments and a first parity fragment of the data fragments to first-level storage media of a storage system for storage, wherein the storage system comprises the first-level storage media and a second-level storage medium, wherein the first-level storage media is a high-speed storage medium, wherein the second-level is a low-speed storage medium, and wherein the first-level storage media and the second-level storage medium are different types of storage media; and
    sending the first parity fragment to the second-level storage medium for storage, wherein the data fragments remain stored in the first-level storage media after the first parity fragment is stored in the second-level storage medium.

11. The method of claim 10, wherein the storage system further comprises a third-level storage medium, wherein a first-level storage medium of the first-level storage media is configured to store a second parity fragment, wherein the fragment management method further comprises sending the second parity fragment to the third-level storage medium, and wherein performance of the third-level storage medium is between the performance of the of the second-level storage medium and the performance of the first-level storage media.

12. The method of claim 11, wherein the second parity fragment is configured to check a subset of the data fragments.

13. The method of claim 12, further comprising calculating the second parity fragment using a local reconstruction code (LRC) technology on the subset of the data fragments.

14. A computing node for migrating data, comprising:
a memory configured to store instructions; and
a processor coupled to the memory and configured to execute the instructions to cause the processor to be configured to:
send data fragments to first-level storage media for storage; and
send a first parity fragment of the data fragments from first-level storage media to a second-level storage medium for storage, wherein the first-level storage media is a high-speed storage medium, wherein the second-level is a low-speed storage medium, wherein the first-level storage media and the second-level storage medium are different types of storage media, and wherein the data fragments remain stored in the first-level storage media after the first parity fragment is stored in the second-level storage medium.

15. The computing node of claim 14, wherein the instructions further cause the processor to be configured to send a second parity fragment to a third-level storage medium, and wherein performance of the third-level storage medium is between the performance of the second-level storage medium and the performance of the first-level storage media.

16. The computing node of claim 15, wherein the second parity fragment is configured to check a subset of the data fragments.

17. The computing node of claim 16, wherein the instructions further cause the processor to be configured to calculate the second parity fragment using a local reconstruction code (LRC) technology on the subset of the data fragments.

18. The computing node of claim 14, wherein the data fragments and the first parity fragment meet an erasure code (EC) algorithm, and wherein the data fragments have a higher read/write frequency than the first parity fragment.

19. A computing node for data migrating in a storage system comprising first-level storage media and a second-level storage medium, wherein data fragments and a first parity fragment of the data fragments are located in the first-level storage media, the computing node comprising:
a memory configured to store instructions; and
a processor coupled to the memory and configured to execute the instructions to cause the processor to be configured to send a first migration instruction for migrating the first parity fragment from the first-level storage media to the second-level storage media,
wherein the first-level storage media is a high-speed storage medium,
wherein the second-level is a low-speed storage medium,
wherein the first-level storage media and the second-level storage medium are different types of storage media, and
wherein the data fragments remain located in the first-level storage media after the first parity fragment is migrated to the second-level storage media.

20. The computing node of claim 19, wherein the storage system further includes a third-level storage medium, wherein the first-level storage media is further configured to store a second parity fragment, wherein the processor is configured to execute the instructions to cause the processor to be configured to send a second migration instruction for migrating the second parity fragment to the third-level storage medium, and wherein performance of the third-level storage medium is between the performance of the second-level storage medium and the performance of the first-level storage media.

* * * * *